The compounds of this invention are white crystalline solids. They are prepared by reacting a nucleoside; i.e., a five carbon sugar attached to either a purine or pyrimidine base, with an adamantyl-1-carboxylchloride or anhydride. Because of the fact that the five carbon sugar moiety can react with an acid chloride or anhydride at more than one hydroxyl group, it is customary, if it is desired to prepare an ester on the number 5 carbon, to protect the number 2 and 3 hydroxyls by ketal formation thereon, as with acetone, prior to the reaction with the acylating reagent. In this instance, the acylation reaction is carried out in basic media to avoid hydrolysis of the ketal protective group, which group is readily removed by treatment with acid after the acylation reaction is completed. If the five carbon sugar is a deoxy sugar, however, the hydroxyl group in the number 2 position is not present and ketal formation is not possible; protection of the 3'-hydroxyl by an acetyl group is possible but involves several steps. Fortunately, an acylation reaction with adamantal-1-carboxylchloride carried out on a deoxy nucleoside yields only the 5' adamantoate ester derivative. Other blocking groups can, of course, be used to prevent reaction of the adamantane carboxylchloride or anhydride at the 2' or 3' hydroxyls.

Compounds of this invention in which the adamantoyl group is attached to the sugar through the hydroxyl on the 3' carbon atom are prepared by first blocking the hydroxyl on the 5' carbon with a trityl or like group and then carrying out the acylation reaction in the usual manner. With the 5' position blocked, the adamantyl-1-carboxylchloride reacts with the hydroxyl on the 3' carbon. The desired compound is then readily obtained by removing the blocking group with dilute acid. Compounds of this invention carrying an acetyl group on either one or both of the 2' and 3' positions of the 5 carbon sugar can be prepared by adamantoylation of a nucleoside in which one or more acetyl groups are already present. Alternatively, any of the compounds prepared by the above procedures can be acetylated on both the 2' and 3' positions, in the case of a normal sugar and on the 3' position in the case of a deoxy sugar, by employing acetic anhydride in pyridine or other conventional acetylating agents.

The compounds of this invention are useful for killing virus in vitro as in media suitable for tissue culture experiments. In particular, they are able to suppress the growth of vaccinia virus in a human amnion cell line. They also have considerable cytotoxic activity in vitro and are therefore useful in the study of the relationship of nucleosides to the tumor cell, including the study of the metabolism of nucleosides by tumor cells. It is particularly noteworthy that 5'-O-adamantoyl-6-azauridine is quite effective against the ascitic form of the Taper hepatoma in mice, and that 5'-O-adamantoyl-6-thioinosine is quite active against acute lymphatic leukemia strain L1210 in mice. In fact, this latter compound is more active on a weight basis than 6-thioinosine itself and has an activity comparable to 6-mercaptopurine, while on a molecular basis it is about 2.5–3 times more active than 6-mercaptopurine. Furthermore, the compounds of this invention, particularly 5'-O-adamantoyl-6-thioinosine, are capable of suppressing antibody formation in mice challenged with sheep erythrocytes. Finally, 5'-O-adamantoyl-adenosine, as well as other compounds of this invention, is capable of inhibiting platelet aggregation and is thus potentially useful as an anticoagulent drug in the treatment of various abnormal cardiovascular conditions.

This invention is further illustrated by the following specific examples.

Example 1.—5'-O-adamantoyl-inosine

One gram of 2',3'-O-isopropylideninosine was dissolved in 50 ml. of anhydrous pyridine. 1.28 grams of adamantane-1-carboxylchloride was then added. The reaction mixture was allowed to remain at ambient room temperature for about 16 hours. Ten milliliters of water were introduced, and the resulting mixture was stirred for about 30 minutes. The volatile materials were removed by evaporation in vacuo. The residue was washed three times with 100-ml. portions of water, and was then dissolved in 100 ml. of methanol. The methanolic solution was decolorized with activated charcoal. The charcoal was separated by filtration, and the filtrate was evaporated to dryness in vacuo. The resulting residue, comprising 5'-O-adamantoyl-2',3'-O-isopropylideninosine, was triturated with ether. This product gave only a single spot on paper strip chromatography using an ethyl acetate-methanol solvent mixture.

The above adamantoyl derivative was dissolved in a mixture of 300 ml. of methanol and 100 ml. of 0.5 N aqueous hydrochloric acid. The resulting solution was heated to reflux for about 45 minutes and then cooled. The acidity of the solution was adjusted to pH=7.0 with cold 10 percent aqueous ammonium hydroxide. The neutralized mixture was decolorized with charcoal and was filtered. Evaporation of the filtrate to dryness yielded 5'-O-adamantoyl-inosine, which melted in the range 202–205° C. after recrystallization from an ethyl acetate-methanol solvent mixture. This compound also yielded only a single spot on paper strip chromatography.

*Analysis.*—Calc.: C, 58.59; H, 6.09; N, 13.02. Found: C, 58.53; H, 6.33; N, 12.44.

5'-O-(3'',5''-dimethyladamantoyl)inosine was prepared by the above procedure except that 3,5-dimethyladamantane-1-carboxylchloride was substituted for adamantane-1-carboxylchloride. 5'-O-(3'',5''-dimethyladamantoyl)inosine thus prepared was isolated and purified by the above procedure and melted at 208–209° C. after recrystallization from an ethyl acetate-methanol solvent mixture.

*Analysis.*—Calc.: C, 60.25; H, 6.59; N, 12.22. Found: C, 60.10; H, 6.75; N, 12.46.

5'-O-adamantoyl-adenosine was prepared by the above procedure except that isopropylidenadenosine was used in place of isopropylideninosine. 5'-O-adamantoyl-adenosine thus prepared was recrystallized from dichloromethane.

*Analysis.*—Calc.: C, 58.73; H, 6.34. Found: C, 58.66; H, 6.75.

5' - O - adamantoyl - 6 - thioinosine was prepared by the above procedure except that isopropylidene-6-thioinosine [prepared by the procedure of Zderic, Moffat, Gerzon, Kau and Fitzgibbon, J. Med. Chem., 8, 275 (1965)] was used in place of isopropylideninosine. 5'-O-adamantoyl-6-thioinosine thus prepared was recrystallized from methanol. M.P.=226–227° C.

*Analysis.*— Calc.: C, 56.48; H, 5.87; N, 12.55. Found: C, 56.59; H, 6.08; N, 12.48.

Other compounds prepared by the above procedure include: 5' - O - (3'',5'' - dimethyladamantoyl)adenosine; M.P.=158–159° C.

*Analysis.*—Calc.: C, 60.38; H, 6.83; N, 15.31. Found: C, 60.23; H, 6.85; N, 15.05.

5' - O - (3'',5'',7'' - trimethyladamantoyl)adenosine; M.P.=179–180° C.

*Analysis.*—Calc.: C, 61.13; H, 7.05; N, 14.85. Found: C, 60.89; H, 7.46; N, 14.43.

5' - O - (3'', 5'', 7'' - trimethyladamantoyl) - 6 - azauridine; M.P.=122–124° C.

*Analysis.*—Calc.: C, 58.78; H, 6.95; N, 9.35. Found: C, 58.76; H, 7.18; N, 9.69.

5' - O - adamantoyl - 6 - azauridine; M.P.=179–180° C.

*Analysis.*—Calc.: C, 56.01; H, 6.19; N, 10.31. Found: C, 55.95; H, 6.34; N, 10.06.

5' - O - (3'',5'' - dimethyladamantoyl) - 6 - azauridine; this compound did not crystallize but was proved to be one spot material by thin layer chromatography on silica gel in a chloroform-ethyl acetate solvent mixture.

Oct. 22, 1968  A. W. BARBER  3,407,192
CONTROL OF PHOTOCELL ILLUMINATION BY SHUTTER
HAVING PROGRAMMED MOVEMENT
Filed Nov. 3, 1966  2 Sheets-Sheet 2

INVENTOR.
Alfred W. Barber

United States Patent Office 3,407,192
Patented Oct. 22, 1968

3,407,192
CONTROL OF PHOTOCELL ILLUMINATION BY SHUTTER HAVING PROGRAMMED MOVEMENT
Alfred W. Barber, Bayside, N.Y.
(32—44 Francis Lewis Blvd., Flushing, N.Y. 11358)
Filed Nov. 3, 1966, Ser. No. 591,777
1 Claim. (Cl. 250—225)

The present invention concerns function generators and, in particular, methods of and means for generating analog functions of voltage or frequency.

In analog computer systems it is often necessary to provide analog functions, generally in the form of DC voltages which vary with time in accordance with predetermined functions. Since these functions are generally very complex and often take unusual forms, means for reproducing them rapidly and easily are highly desirable.

In the past, the so-called diode function generator has been widely used. (Reference is made to "Electronic Analog and Hybrid Computers" by Korn and Korn, McGraw-Hill Book Co. 1964 pp. 233–240). Other types include varistor and cathode-ray function generators. (See above reference pp. 240–243.) These previously available function generators are complex, expensive and difficult to use.

The present invention concerns a simple, inexpensive and easily used function generator. Its basic parts consist of a perforated disc carrying pins representing the desired function, a spring biassed arm in contact with one of the pins, a shutter carried by the arm, a photoconductive cell one side of the shutter, a lamp on the other side of the shutter and means for utilizing the resulting variation of the cell resistance representing the function. The pins are arranged on equally spaced radial on the disc. Equally spaced holes are provided on the radials and pins are placed in the holes according to a predetermined pattern. The distance of a given pin from the center of the disc represents the amplitude of the analog function. The disc is rotated at constant speed so that pins on successive radials move the shutter arm at predetermined equal time intervals. The shutter moved by the arm controls the light from he lamp reaching the photoconductive cell so that the cell resistance varies directly in accordance with the analog function or inversely depending on whether the shutter moves to increase or decrease the light reaching the cell as the distance of pins increase from the center of the disc.

The controlled resistance of the photoconductive cell representing the function can be utilized in many ways. It can be used, for example, to control the output voltage of an operational amplifier by connecting the function controlled cell as the feedback resistor of the amplifier. It can be used as the input resistor of an operational amplifier to control the input current to the amplifier. These two circuits yield an analog DC voltage at the output of the operational amplifier.

If the analog function controlled photoconductive cell is used in a unijunction relaxation or other resistance controlled oscillator circuit, a digital output representing the analog function is provided. This is an extremely simple and effective method of providing a digital conversion from the analog function. The tone representing the digitized analog function can be transmitted over a wire or radio circuit and converted back to a DC analog voltage at the remote end of the circuit. The digitized tone can be recorded on a simple magnetic tape or other recorder and reproduced at a later time or different place without loss of fidelity. It should be noted that DC analog voltages are extremely difficult to transmit or record if any degree of fidelity is to be maintained and extremely precise and very expensive equipment is required.

One of the most important advantages of the present invention is the ease and speed with which the functions can be set up or changed with the perforated disc programmer.

Accordingly, one of the objects of the present invention is to provide a simple, inexpensive and effective function generator.

Another object is to provide a function generator which provides either a DC analog or digitized output.

Still another object is to utilize a photoconductive cell as the programmed element in a function generator.

A still further object is to provide a function generator in which the desired function is easily inserted and readily visible.

These and other objects will be apparent to those skilled in the art from the detailed description of the invention given in connection with the various figures of the drawing.

In the drawing:

FIGURE 1 is a plan view of a typical perforated disc used in connection with the present invention.

FIGURE 2 is a simplified representation of the present invention programming a photoconductive cell.

FIGURE 3 is a circuit for converting the programmed photoconductive cell resistance to a programmed DC voltage.

FIGURE 4 is another circuit for converting the programmed photoconductive cell resistance to an analog DC voltage.

FIGURE 10 shows a portion of a modifications of the present invention.

Figure 5:
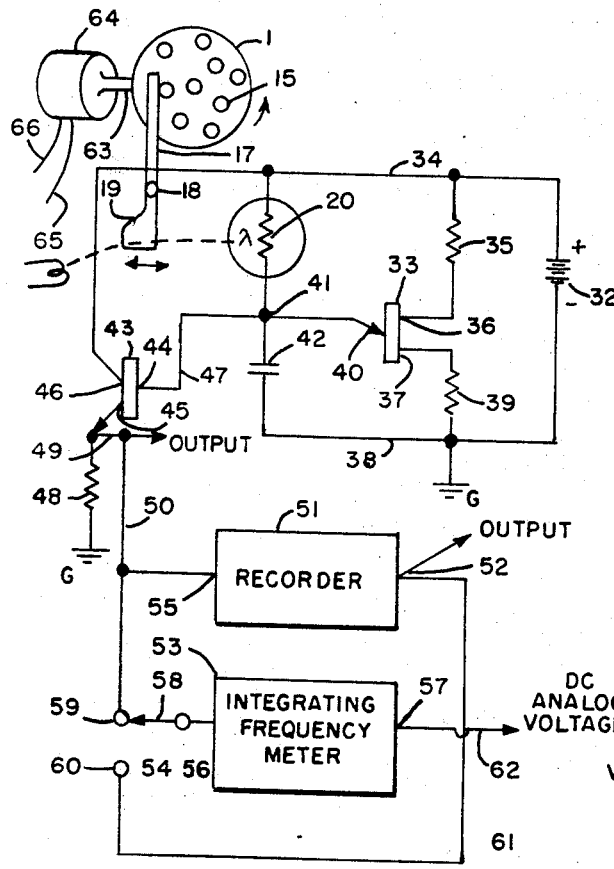
FIGURE 5 is a partly schematic, partly block diagrammatic representation of one form of the present invention.

FIGURES 1 and 2 may be considered together for an initial understanding of the present invention. A disc 1 rotatable around a center shaft 2 is provided with equally spaced holes arranged in radial rows 3 through 14 as shown in FIG. 1 only two 15 and 16 being shown in FIG. 2 for the sake of simplification of the drawing. The disc is rotated at a predetermined speed by means not shown in these figures but shown and described more fully below. The holes in the disc are adapted to receive pins which are generally placed one in each radial row and at distances from the center representing amplitude values of an analog function. As the disc rotates these pins, for example 15 and 16 successively push the outer end of arm 17 pivoted at 18 and carrying a shutter 19 at its inner end. Shutter 19 is positioned between a source of illumination 21 and a photoconductive cell 20. When arm 17 is in contact with an outer pin 16, it is rotated so that shutter 19 either uncovers cell 20 or, by proper location of the cell, covers it. Also, when arm 17 is in contact with an inner pin 15, shutter 19 either covers cell 20 or if the cell is positioned to be covered when the shutter is in its first position, covers it. Thus, the resistance of the cell is a function of the shutter position as determined by the particular pin moving arm 17. It is assumed that the light from lamp 21 is substantially constant. This may require that it be energized from a regulated current source 22. To cause arm 17 to closely follow the program represented by the pins, it is biased by suitable means such as spring 69 attached to a fixed position pin 70.

FIG. 3 is a circuit diagram incorporating the analog programmed resistance described above. An operational amplifier 24 including an inverting input 26, a common connection 27 and an output terminal 25 is connected with feedback resistor 29 passing from output 25 to input 26, a source of input voltage 28 with one side connected to common 27 and its other side connected through the programmed cell 20 to input terminal 26. With these connections the output voltage $e_o$ is equal to the input voltage 28 multiplied by the ratio of feedback resistor 29 to cell resistance 20. Thus, if the maximum function value is represented by a pin farthest from the center and shutter 19 has uncovered cell 20 so that its resistance is minimum, the output voltage $e_o$ will also be maximum. The inverse of the function will be generated, if cell 20 is covered, when arm 17 is in contact with a peripherally located pin.

FIG. 4 is another circuit incorporating the analog programmed resistance. In this case resistor 31 is provided in series with input voltage 28 and the programmed cell resistance 20 is connected as the feedback resistor from output 25 to input 26. With this circuit output voltage $e_o$ is proportional to the cell resistance 20. Thus, if shutter 19 covers cell 20 at a peripheral pin position, a direct functional relationship will exist between $e_o$ and the radial distance from the center of pin 16. If shutter 19 uncovers cell 20 in this position, an inverse functional relationship exists.

FIG. 5 shows how the programmed cell resistance can be utilized to provide a digital output. Programmed cell 20 is connected as the frequency determining element of a resistance controlled oscillator as, for example, in a relaxation oscillator circuit including the unijunction transistor 33. The unijunction transistor 33 includes base one 37, base two 36 and emitter 40. It is connected as a relaxation oscillator with base 37 connected through a current limiting resistor 39 to the negative side of a suitable bias source 32, base 36 connected through current limiting resistor 35 to the positive side of the bias source 32, programmed cell 20 connected in series with capacitor 42 in shunt with bases 36 and 37 through resistors 35 and 39, and emitter 40 connected to the junction 41 between cell 20 and capacitor 42. This circuit will oscillate at a frequency which is substantially linear inverse function of the resistance 20. Thus, to provide an output frequency directly proportional to pin distance from the center of disc 1, cell 20 is positioned to be uncovered by shutter 19 for a peripherally located pin. An inverse function will be generated with the complementary cell position. In this figure a motor 64, receiving power over leads 65 and 66 from a source not shown, drives disc 1 over shaft 63.

The digitally programmed oscillator output appearing across capacitor 42 may be utilized in a number of ways. In order not to affect the oscillator frequency due to output circuit loading, a suitable coupling means is provided such as transistor 43 including base 44, emitter 45 and collector 46. Base 44 is connected over lead 47 to junction 41; collector 46 is connected to a source of positive bias such as source 32, and emitter 45 is connected through a suitable emitter resistor 48 to ground G. The output, now well isolated from the oscillator circuit, is taken from emitter 45 over lead 49 and may thus provide an output. Or, the oscillator output can be recorded by applying it over lead 50 to input terminal 55 of recorder 51. Recorder 51 may be any recorder which records with reasonable fidelity and maintains a reasonably constant speed on recording and play-back. The digitized oscillator signal as recorded may then be utilized by playing it back to output 52.

A DC analog voltage from the digitized oscillator signal can be provided by the use of a suitable frequency to voltage converter such as integrating frequency meter 53. This conversion can be accomplished from the digitized output directly by connecting it to input 56 as by means of switch 54-58-59 or by any other route as from the output of recorder 51 by means of switch 54-58-60. The DC analog voltage resulting in either case appearing at output 57 is supplied over lead 62 to further utilization means.

Figure 6:
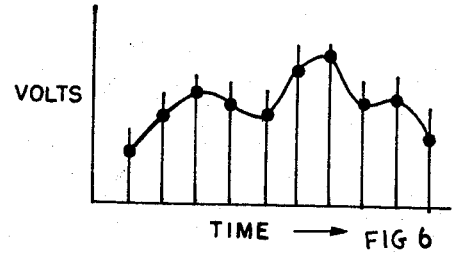
FIGURE 6 is a graphical illustration of one mode of operation of the present invention.

FIG. 6 illustrates the operation of the present invention in which the analog function is shown by curve A. The vertical axis is the analog amplitude, for example, DC volts and the horizontal axis is time. The equally spaced vertical time lines intersect curve A at vertical positions representing amplitude increments and are the same as the radial distances on the discs, since the equally angled radial lines also represent equal time intervals.

Figure 7:
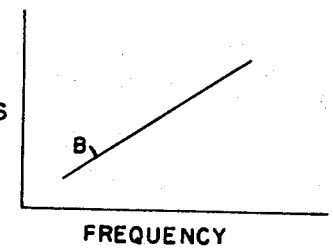
FIGURE 7 is a graphical representation of either a voltage to frequency digitizer or a frequency to voltage analog converter.

FIG. 7 is a graph of a linear relationship between voltage and frequency. This graph can be used to illustrate how the frequency of a voltage controlled oscillator is related to the exciting voltage or it can be used to illustrate a linear relationship between output volts and input frequency in an integrating type frequency meter or equivalent frequency to voltage converter. Such a frequency meter or frequency to voltage converter is utilized as the converter 53 in FIG. 5.

Figure 8:
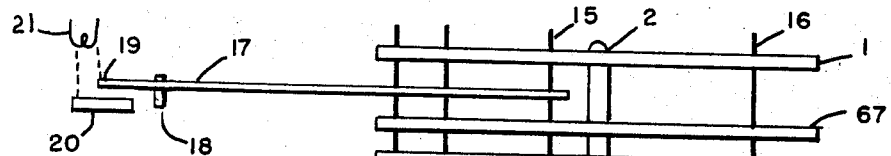
FIGURE 8 is a simplified representation of one form of motor driven perforated disc system suitable for use in one form of the present invention.

FIG. 8 shows a convenient form of disc arrangement. Here two perforated discs 1 and 67 are provided carried by the central shaft and driven by motor 64. By separating the discs as shown and by providing a third and unperforated disc 68 the program pins 15–16, etc., are easily inserted through aligned holes in the discs 1 and 67 and allowed to come to rest on disc 68. The double disc arrangement supports the pins so that arm 17 does not tilt or displace them although they may fit loosely. This also allows quick and easy changing of pin location so as to change the program. Wooden tooth-picks, for example, have been used as pins.

Figure 9:
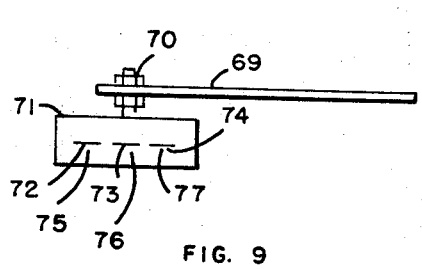
FIGURE 9 shows a portion of another form of the present invention using a potentiometer resistance programmer.

FIG. 9 shows a modification embodying the programming of a mechanically variable rheostat 71 in place of the photoconductive cell utilized in the other figures. The actuating arm (for contacting the disc carried pins) 69 is clamped to shaft 70 of the rheostat so that the programmed motion of arm 69 varies the resistance between contacts 72–73 and 73–74 available over leads 75–76 and 76–77. This programmed resistance, either increasing with pin distance from the disc center, or decreasing depending on the pair of terminals utilized, may be used in the circuits of FIGS. 3, 4, and 5 although this arrangement lacks many of the advantages of the photoconductive cell system. On the other hand, it is extremely simple and inexpensive and may have applications where very low cost is important.

FIG. 10 shows a modification of a portion of the present invention in which a tape 78 is passed across the programming pins 15–16 etc. in order to smooth the travel of the arm from pin to pin.

Figures 11, 12:
FIGURES 11 and 12 show two modifications of the shutter which may be used in the present invention.

FIGS. 11 and 12 show how the shutter may be formed to modify the manner in which the cell resistance is varied in relationship to shutter position or angle of the shutter control arm.

While only a few forms of the present invention have been shown and described, many modifications will be apparent to those skilled in the art and within the spirit and scope of the invention as set forth, in particular, in the appended claim.

What is claimed is:

1. In an electronic function generator, the combination of, a source of illumination, a photoconductive cell positioned to receive at least a portion of the light from said source of illumination, a movable shutter positioned to be partly between said cell and said source of illumination for controlling the resistance of said cell in accordance with the position of said shutter, said shutter comprising a portion for interrupting light falling on said cell and a cam-following arm, means for programming said shutter in order to program the resistance of said cell and utilization means coupled to said cell for utilizing the programmed resistance of said cell, said means for programming said shutter including a circular disc provided with sets of radially extending holes for receiving a plurality of pins to represent a given function, and means for rotating said disc at a substantially constant rate, said cam-following arm riding on said pins for coupling said pins with said shutter in order to program said shutter in accordance with the program represented by said pins.

References Cited

UNITED STATES PATENTS

| | | | |
|---|---|---|---|
| 1,228,730 | 6/1917 | Winkler | 74—568 |
| 1,486,348 | 3/1924 | Kinder | 74—568 |
| 2,408,589 | 10/1946 | Wells | 250—237 X |
| 2,474,380 | 6/1949 | Simmon | 250—237 |
| 2,497,042 | 2/1950 | Doll | 250—237 X |
| 2,756,930 | 7/1956 | Pelson et al. | 250—237 X |
| 2,806,405 | 9/1957 | Amand | 250—233 X |
| 3,128,387 | 4/1964 | Hughes et al. | 250—237 |
| 3,297,924 | 1/1967 | Kamm | 235—197 X |

ROBERT SEGAL, *Primary Examiner.*